Nov. 30, 1937.　　　K. BRATRING　　　2,100,832
MOLD FOR MAKING HOLLOW ARTICLES FROM PLASTIC MATERIALS
Filed Nov. 30, 1932
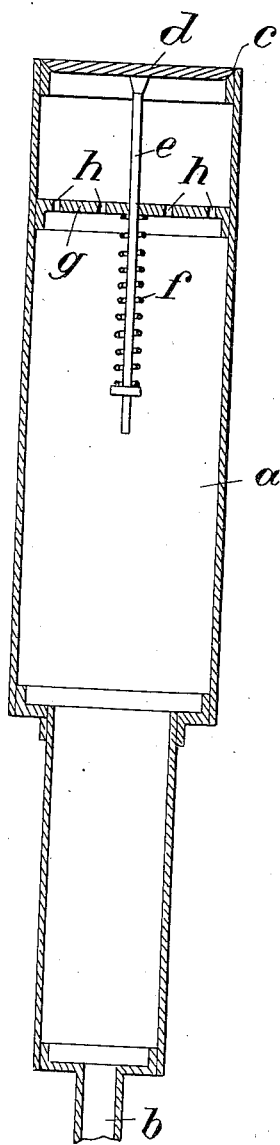
Inventor:
Kurt Bratring
By attorney Patented Nov. 30, 1937

2,100,832

UNITED STATES PATENT OFFICE 2,100,832

MOLD FOR MAKING HOLLOW ARTICLES FROM PLASTIC MATERIALS

Kurt Bratring, Berlin-Charlottenburg, Germany

Application November 30, 1932, Serial No. 644,941
In Germany March 18, 1932

2 Claims. (Cl. 18—41)

For making hollow articles from plastic materials, dipping molds have already been proposed which were provided with a valve. These dipping molds have a round end which is provided with a small opening at the apex of the curve. In a known mold, the opening is closed with a leaf of cellulose ester or a plug which is rather complicated for manufacture on a large scale. In another form of mold, a small opening is closed by a spring valve which opens when the mold is rotated to one side, a spring being tensioned; by turning to the other side the valve is returned to its original position.

These molds, because they make it possible for air to enter between the hollow article and the mold in the withdrawal of the hollow article, are more useful than arrangements without valves, but they are not very suitable for manufacture on a large scale. The closing or the opening of the valve requires a number of handles, the inflow opening for the air is only small and the complete releasing of the hollow article from the mold is not entirely ensured and finally only hollow articles with curved end surfaces can be made with these molds.

The blow-off molds permit of simpler operation. These, however, have sharp edges at the point where the blow pipe opens. Also, when the edges are covered with a bored out hollow body of cellulose ester, there are still unevennesses in the hollow article near this boring.

According to the present invention, completely smooth hollow articles are obtained by means of blow off molds which have at the ends opposite to the compressed air inlet insertions held by springs and forming a smooth surface with the plane of the mold. When air is blown in for removing the hollow article from the mold, the insertions are forced out and the air escapes round the periphery of the insertions, that is, over a large surface below the hollow article so that it is at once released completely from the mold. On account of the special construction of the mold, the hollow articles do not have the slightest unevenness on the inner side. They may have a flat end as well as a hemispherical end. When no more air is blown in, the insertions which are probably conical are drawn back into their original position by the springs.

The blow-off molds can be made from many kinds of material, metals, artificial resins, vulcanite and so on. It is only necessary that they should be chemically inert to the solutions from which the hollow articles are made.

They may be of various shapes. For making tubes, bushings and so forth, cylindrical molds are used, conical molds are used for making containers and angular molds are also possible.

In the accompanying drawing a constructional form is illustrated in section.

$a$ is the blow-off mold itself, $b$ the inserted tube for the introduction of compressed air and $c$ the opposite end of the mold in which the insertions are found. In the form illustrated the mold has only one insertion $d$, the oblique edges of which lie closely against the end part of the mold $c$. On the shaft $e$ of the insertion $d$ is arranged a spring $f$. The shaft has a guide $g$, which in the present construction is formed as a plate and is provided with several holes $h$.

What I claim is:

1. In a mold, a hollow body member having connection to a source of fluid under pressure, an enlarged aperture at one end of said body provided with a bordering valve seat, a valve member engaging said seat providing a form sustaining member for an object to be molded and to release the same bodily upon opening outwardly, a partition in said body provided with a plurality of apertures, a valve stem connected to said valve member, and yieldingly resistant means engaging said stem for retaining said valve member on its seat.

2. In a mold, a hollow body member having connection to a source of fluid under pressure, an enlarged aperture at one end of said body provided with a bordering valve seat, a valve member engaging said seat providing a form sustaining member for an object to be molded and to release the same bodily upon opening outwardly, a partition in said body provided with a plurality of apertures, a valve stem connected to said valve member and yieldingly resistant means engaging said stem for retaining said valve member on its seat, said valve member being displaceable from its seat in response to fluid pressure established in said body.

KURT BRATRING.